(12) United States Patent
Lim et al.

(10) Patent No.: US 7,916,638 B2
(45) Date of Patent: Mar. 29, 2011

(54) TIME-INDEPENDENT DEFICIT ROUND ROBIN METHOD AND SYSTEM

(75) Inventors: Pin Lim, Coto De Caza, CA (US); Gregory Powers, Huntington Beach, CA (US)

(73) Assignee: Alcatel Lucent, Paris (FR)

( * ) Notice: Subject to any disclaimer, the term of this patent is extended or adjusted under 35 U.S.C. 154(b) by 1100 days.

(21) Appl. No.: 10/746,059

(22) Filed: Dec. 24, 2003

(65) Prior Publication Data

US 2005/0141424 A1      Jun. 30, 2005

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. ........................................ 370/235; 370/412
(58) Field of Classification Search .................. 370/235, 370/412, 395.4, 468
See application file for complete search history.

(56) References Cited

U.S. PATENT DOCUMENTS

| | | | | |
|---|---|---|---|---|
| 6,101,193 A * | 8/2000 | Ohba | ........................... | 370/429 |
| 6,157,955 A * | 12/2000 | Narad et al. | ................... | 709/228 |
| 6,532,501 B1 * | 3/2003 | McCracken | ................... | 710/52 |
| 6,876,659 B2 * | 4/2005 | Aznar et al. | ................ | 370/395.1 |
| 7,110,411 B2 * | 9/2006 | Saidi et al. | .................. | 370/395.4 |
| 2003/0076848 A1 * | 4/2003 | Bremler-Barr et al. | ........ | 370/412 |
| 2003/0112817 A1 * | 6/2003 | Woo et al. | ...................... | 370/413 |
| 2003/0231645 A1 | 12/2003 | Chandra et al. | ................ | 370/412 |

OTHER PUBLICATIONS

Shreedhar M et al: "Efficient Fair Queuing using Deficit Round Robin" Computer Communication Rview, Association for Computing Machinery, New York, US, vol. 25, No. 4, Oct. 1, 1995, pp. 231-242. XP000541659: ISSN: 0146-4833 Chapter 3.

\* cited by examiner

*Primary Examiner* — Ricky Ngo
*Assistant Examiner* — David Oveissi
(74) *Attorney, Agent, or Firm* — Galasso & Associates, L.P.

(57) ABSTRACT

A scheduling mechanism and method for scheduling the output of frames from a plurality of priority queues in a network router or multi-layer switch is disclosed. The method of scheduling packets generally includes the steps of: allocating bandwidth credits for a plurality of queues; dequeuing frames from a current queue if there is available credit; deducting the available credit in accordance with the credit requirements of the frames that are dequeued; and replenishing the available credit for each of the queues when the available credit for the current queue is insufficient to dequeue a frame. Since the available credit for each of the queues is replenished as needed instead of at a regular or periodic interval, the scheduling method is executed independent of time and with reduced computational resources. The present invention offers an efficient variant of deficit round robin, while reducing the computation burden associated with conventional deficit round robin.

24 Claims, 4 Drawing Sheets

TIME-INDEPENDENT DEFICIT ROUND ROBIN METHOD AND SYSTEM

FIELD OF INVENTION

The invention relates generally to a technique for allocating output bandwidth to a plurality of packet buffers in a switch or router. In particular, the invention relates to a system and method for replenishing bandwidth credits in a queue scheduler as needed without using a timer or refresh interval.

BACKGROUND

Routers and multi-layer switches in packet-switched networks transmit frames between ingress ports and egress ports with different levels of class of service (CoS). CoS generally refers to the preferential treatment with which some flows are given access to system resources including access to output ports and switch fabric for example. To service the different flows competing for the same port for example, the flows are generally segregated into a plurality of queues, each queue being associated with a different priority level. A queue scheduler is then employed to fairly regulate distribution of the frames from the queues in a manner that gives precedence to the higher priority queues without starving the lower priority queues.

One approach to scheduling queue output is referred to as deficit round robin (DRR). In this approach, the scheduler allocates credits representing units of bandwidth to each of the queues. The credits are then spent as frames are distributed from the queues. If the available credit is less than the credit required to distribute the frame, or otherwise insufficient, the queue may be passed over and the next lower priority queue serviced. At the expiration of a predefined refresh interval, the scheduler re-allocates or otherwise initializes the credits for each of the plurality of queues. The refresh interval on an interface operating at T1 speed is approximately 100 milliseconds while, in comparison, an interface operating at one Gigabit per second is approximately 100 microsecond.

While the DRR scheduling method is effective at fairly allocating output bandwidth, it requires that a clock be maintained and a refresh interval monitored for periodic credit assignments. Unfortunately, the clock and the refresh interval consume computational resources including a significant number of clock cycles on the processor implementing the scheduling method. In many cases, the processor is a specialized network processor also responsible for other tasks including classification and forwarding decisions, for example. In an age when network wire speeds have surpassed one gigabit per second and higher, the computational resources necessary to support standard DRR are unduly burdensome. There is therefore a need for a scheduling mechanism that obviates the need to maintain a scheduler clock and monitor a refresh interval.

SUMMARY

The present invention features a method and system for scheduling frames for output from a plurality of queues using bandwidth credits that are spent by outputting frames and are subsequently replenished as needed in a manner independent of time. In the first embodiment, the time-independent scheduling method comprises the steps of: allocating credit for each of a plurality of queues; dequeuing a frame from a first queue within the plurality; reducing the credit for the first queue by a credit requirement of the frame; and allocating additional credit for the first queue in response to detecting that a second queue within the plurality has insufficient credit to dequeue a frame.

In a second embodiment, the time-independent scheduling method comprises the steps of: allocating credit for a plurality of queues, respectively; dequeuing frames from the plurality of queues, respectively; reducing the credit for the plurality of queues, respectively, by credit requirements of the frames dequeued from the plurality of queues, respectively; and allocating additional credit for the plurality of queues, respectively, in response to detecting that any queue within the plurality has insufficient credit to dequeue a frame.

The time-independent scheduling method in its several embodiments causes the available credit for each of the plurality of queues to be replenished as needed by one or more queues rather than at regular intervals. The need to maintain a clock for scheduling and for periodically replenishing credits is obviated, thereby avoiding the associated computational cost. Thus, the present invention in several embodiments is able to fairly allocate bandwidth while reducing the demands on computing resources.

BRIEF DESCRIPTION OF THE DRAWINGS

The present invention is illustrated by way of example and not limitation in the figures of the accompanying drawings, and in which.

DETAILED DESCRIPTION

Figure 1:
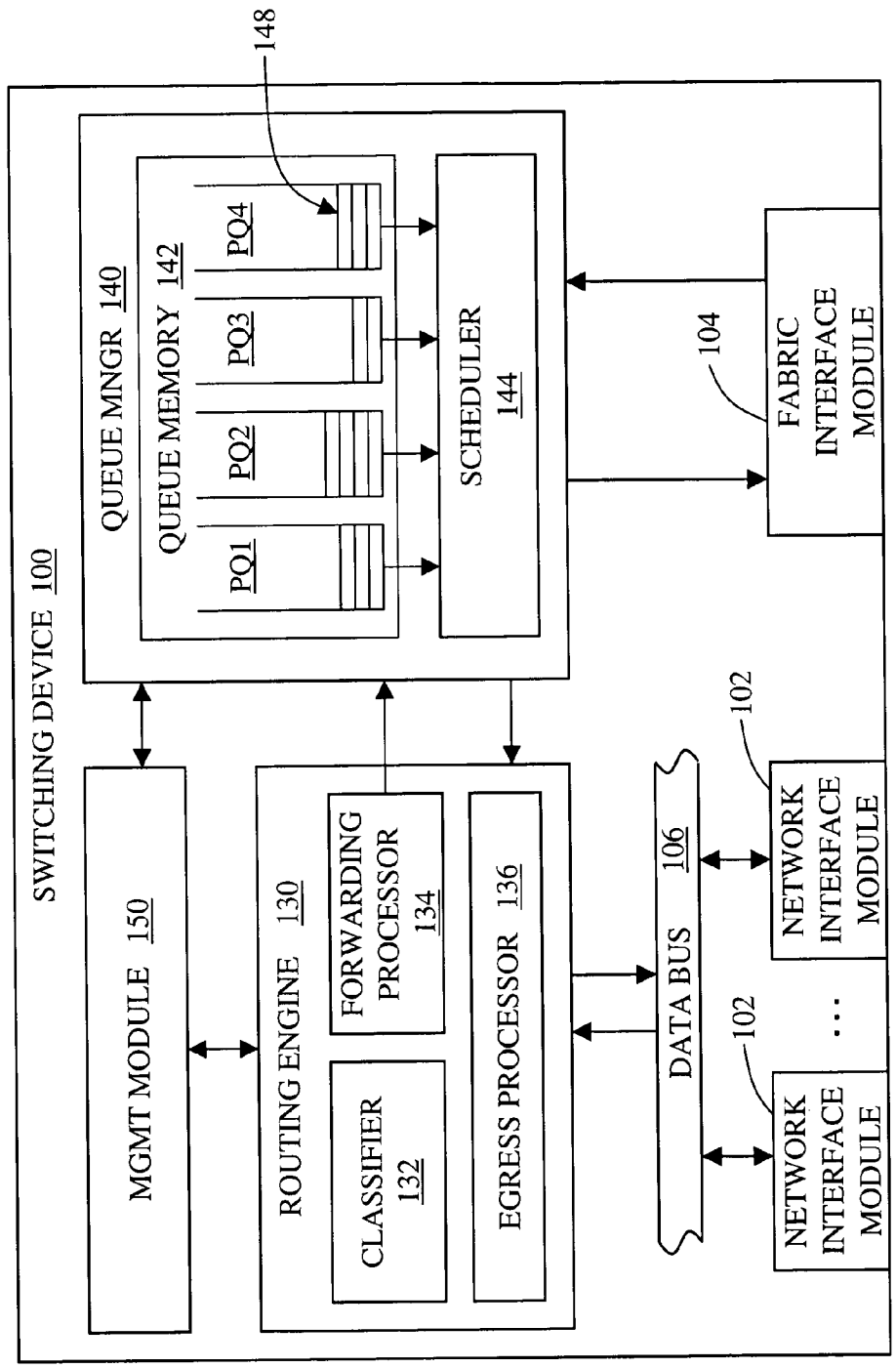
FIG. 1 is a functional block diagram of a switching module, according to the preferred embodiment of the present invention.

Illustrated in FIG. 1 is a functional block diagram of network switching device with which the invention may be implemented. The switching device 100 in the preferred embodiment is adapted to perform switching and routing operations with protocol data units (PDUs) at layer 2 and layer 3 as defined in the Open Systems Interconnect (OSI) reference model. The switching device 100 is preferably one of a plurality of switching devices operatively coupled to one another via a common switch fabric (not shown). The switching devices are in turn operatively coupled to a plurality of nodes in a communication network embodied in a local area network (LAN), wide area network (WAN), metropolitan area network (MAN), or a combination thereof, for example.

The switching device 100 of the preferred embodiment generally comprises one or more routing engines 130, a queue manager 140, and a management module 150. The one or more routing engines 130 are operatively coupled to the network via a plurality of network interface modules (NIMs) 102, each of the NIMs 102 including at least one external port operatively coupled to a communications link for purposes of receiving ingress data traffic and transmitting egress data traffic. As used herein, traffic entering the switching device 100 at the NIMs 102 is referred to as ingress traffic while traffic exiting at a NIM 102 is referred to as egress traffic. The NIM 102 ports are preferably Ethernet-enabled media access control (MAC) interfaces enabled with Institute of Electrical and Electronics Engineers (IEEE) standard 802.3.

The PDUs of the ingress and egress traffic are conveyed between the plurality of NIMs 102 and routing engine 130 via one or more internal data buses 106. The routing engine 130 of the preferred embodiment comprises a classifier 132 and a forwarding processor 134, and egress processor 136. The classifier 132 generally parses ingress PDUs; extracts one or more fields of the PDU including source and or destination addresses, protocol types, and priority information; and maps the PDU to one of a set of flow categories based upon local policies defined by a network administrator via the management module 150. The local policies prescribe the class of service (CoS) and or quality of service (QoS) to be applied the PDU.

The forwarding processor 134 then prepares the ingress PDU for transmission using address information compiled by the switching device 100. If the destination physical address of the PDU is matched in the MAC address tables, the appropriate output port is identified and the frame is switched to the egress port of the appropriate egress switching device. If, however, the PDU includes a destination network address of a node in another network domain, the forwarding processor searches known IP addresses in a forwarding table retained in a content addressable memory (CAM), for example; retrieves the next-hop MAC address of an adjacent device to which the packet is to be forwarded; and encapsulates the packet in a new layer 2 header. The PDUs of the ingress flow are then passed from the routing engine 130 to the queue manager 140 where they are buffered prior to transmission to the switch fabric (not shown) via the fabric interface module 104.

In addition to the ingress processing described above, the routing engine 130 also processes egress traffic received from the switch fabric. In support of this egress traffic, the routing engine 130 further includes an egress processor 136 that receives egress traffic from the queue manager 140 or fabric interface module 104 that is then passed to the designated egress port among the NIMs 102.

The queue manager 140 is comprised of at least one queue memory 142 and queue scheduler 144. The queue memory 142 includes a plurality of packet buffers or queues, each of which is associated with a different priority level or a different level of QoS/CoS. In the preferred embodiment, there are four priority queues PQ1-PQ4, although this is subject to variation depending on the application. When output bandwidth is available, a buffered PDU is transmitted to the switch fabric via the fabric interface module 104. The priority queues PQ1-PQ4 are generally first-in-first-out (FIFO) memory devices that compete for output bandwidth managed or otherwise regulated by the scheduler 144.

The queue scheduler 144 coordinates the output of PDUs 148 from the plurality of queues PQ1-PQ4 to the fabric interface module. In the preferred embodiment, the scheduler 144 performs time division multiplexing of the output, each queue being afforded a quantity of bandwidth correlated with the priority level of the queue and or the frames retained therein. The queue scheduler 144 may implement one of various queue-weighting schemes in a manner that efficiently utilizes the output bandwidth while simultaneously optimizing the fairness with which the queues PQ1-PQ4 are allocated fractional portions of the bandwidth. The scheduler of the present invention may also used to transmit PDUs buffered at an egress switching device to one or more egress ports.

Figure 2:
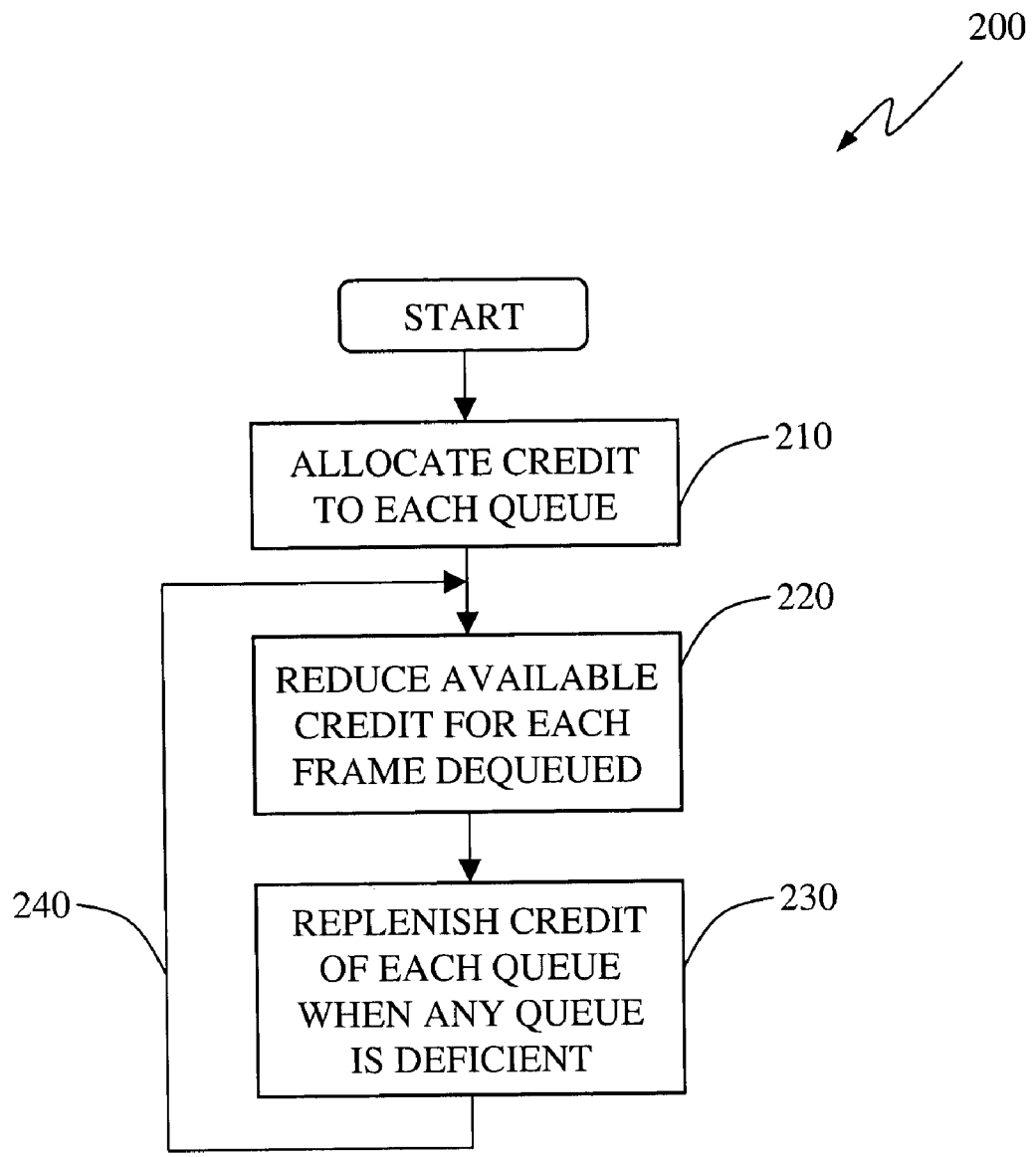
FIG. 2 is a flowchart of the time-independent DRR (TDRR) scheduling method, according to the preferred embodiment of the present invention.

Illustrated in FIG. 2 is a time-independent DRR (TDRR) scheduling method. As with conventional DRR algorithms, the TDRR scheduling begins upon initialization and start-up with the allocation (step 210) of credits to the plurality of priority queues PQ1-PQ4. A credit represents a unit of bandwidth available on the output of the scheduler 144. In the preferred embodiment, a single credit is defined as 64 bytes, representing the minimum size of an Ethernet packet, or an integer multiple thereof.

The amount of credit allotted is generally dependent on the priority level of each queue and the standards by which "fairness" is measured. In the preferred embodiment, the bandwidth credits are assigned to queues PQ1-PQ4 in proportion to the priority level of the queue, which is generally dependent on the priority value of the packets that are retained in the queue. The priority queues PQ1-PQ4 preferably have priority levels one through four, respectively, with four being the highest priority.

Once the credits are assigned, the scheduler 144 begins dequeuing (step 220) the PDUs from the priority queues PQ1-PQ4 progressing from the highest priority queue PQ4 to the lowest priority queue PQ1. As each frame is dequeued, the scheduler 144 deducts the credit consumed by the frame from the available credit for the particular queue. The scheduler 144 is adapted to replenish (step 230) the available credit for each of the queues PQ1-PQ4 when the available credit at any individual queue is insufficient to dequeue the next PDU therein. The credit with which the priority queues PQ1-PQ4 are replenished is assigned in proportion to queue weights whose values are selected to provision the output bandwidth as fairly as possible. In the preferred embodiment, each weight in the set of weights corresponds to the priority of the queue. One skilled in the art will appreciate that the process of replenishing credit is made independent of the periodic updates that drove prior art DRR algorithms to replenish credit at a regular interval regardless of whether the credit was needed or not. If and when the available credit is replenished (step 230), the TDDR method continues to dequeue (step 220) PDUs by way of return path 240 until each of the priority queues PQ1-PQ4 is serviced at least once.

Figure 3:
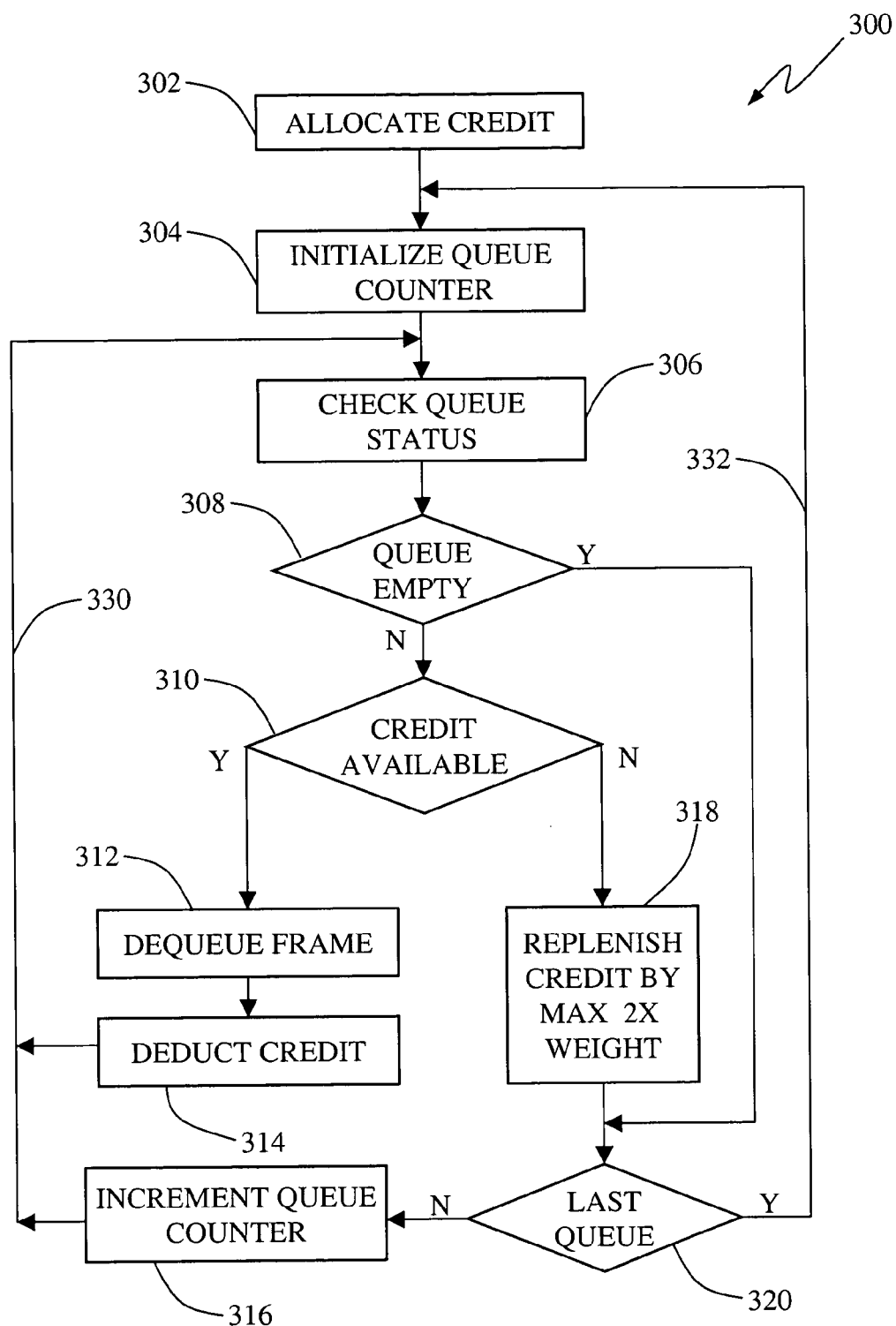
FIG. 3 is a flowchart of the TDRR scheduling method of the first preferred embodiment.

Illustrated in FIG. 3 is the TDRR scheduling method of the first preferred embodiment. When the switching device 100 is initialized or started, the scheduler 144 allocates (step 302) credit to each of the queues PQ1-PQ4 in proportion to the priority level of the queue. The highest priority queue PQ4 is preferably allocated four times as much credit as the lowest priority queue PQ1. The scheduler 144 also initializes (step 304) a queue counter whose value references one of the plurality of queues PQ1-PQ4.

The scheduler 144 subsequently begins servicing a current queue, namely the highest priority queue PQ4. The scheduler first probes the status of the queue PQ4 to determine whether the queue is empty or not. If there is a frame ready to be dequeued in the current queue, the queue testing (step 308) is answered in the negative and the available credit checked. If there is credit available to dequeue the frame, i.e., the frame is smaller than the number of bytes indicated by the available credit, the credit testing (step 310) is answered in the affirmative and the frame dequeued (step 312). The credit consumed by the frame is deducted (step 314) from the available credit. The scheduler 144 in the preferred embodiment repeatedly dequeues frames from the current priority queue until the current queue is empty or the available credit insufficient to dequeue the next frame. In some implementations, the available credit may become insufficient only after a frame is dequeued and the credit deducted causes the available credit to drop to zero or less than zero.

If the current queue being serviced is empty and the queue testing (step 308) answered in the affirmative, the scheduler 144 advances to the next queue. With the exception of the lowest priority queue identified in last queue testing (step 320), the next queue is indicated by the queue counter after it is incremented (step 316). The process by which the queue status is checked (step 306), one or more frames dequeued (step 312), and the credit deducted (step 314) is repeated by way of return path 330 until the frames at the current queue are exhausted or the credit diminished.

If at any point the available credit for the current queue falls below a level sufficient to dequeue a frame at the current priority queue, the credit testing (step 310) is answered in the negative and the credit for each of the queues PQ1-PQ4 replenished (step 318).

In the preferred embodiment, the credit is replenished (step 318) in accordance with a set of credit weights selected so as to fairly apportion scheduler output bandwidth. The assignment of credit may be derived from the initial credit allocation (step 304); taken from the priority levels observed in the incoming frames in the IEEE 802.1p tag, for example; or new priorities assigned using a traffic shaping algorithm. In the preferred embodiment, the weight is derived from the queue number, i.e. the first priority queue PQ1 assigned a weight of one, the second priority queue PQ2 assigned a weight of two, the third priority queue PQ2 assigned a weight of three, and the fourth priority queue PQ4 assigned a weight of four. The actual number of credits awarded (step 318) to queue PQ1-PQ4 is an integer multiple of the credit weights, e.g., two times (2×) the weights.

The credit replenishment (step 318) may occur immediately after the deficiency at a queue is detected or after the end of a cycle in which each of the queues has been serviced. In the process of replenishing (step 318) the credits, the TDDR scheduling method generally advances to the next lower queue indicated by the queue counter after it is incremented (step 316), or decremented depending on the numbering convention. When each of the priority queues PQ1-PQ4 has been serviced and the lowest priority queue emptied or its credit depleted, the last queue testing (320) is answered in the affirmative and the scheduler 144 preferably resets and returns to initial conditions by way of return path 332.

Figure 4:
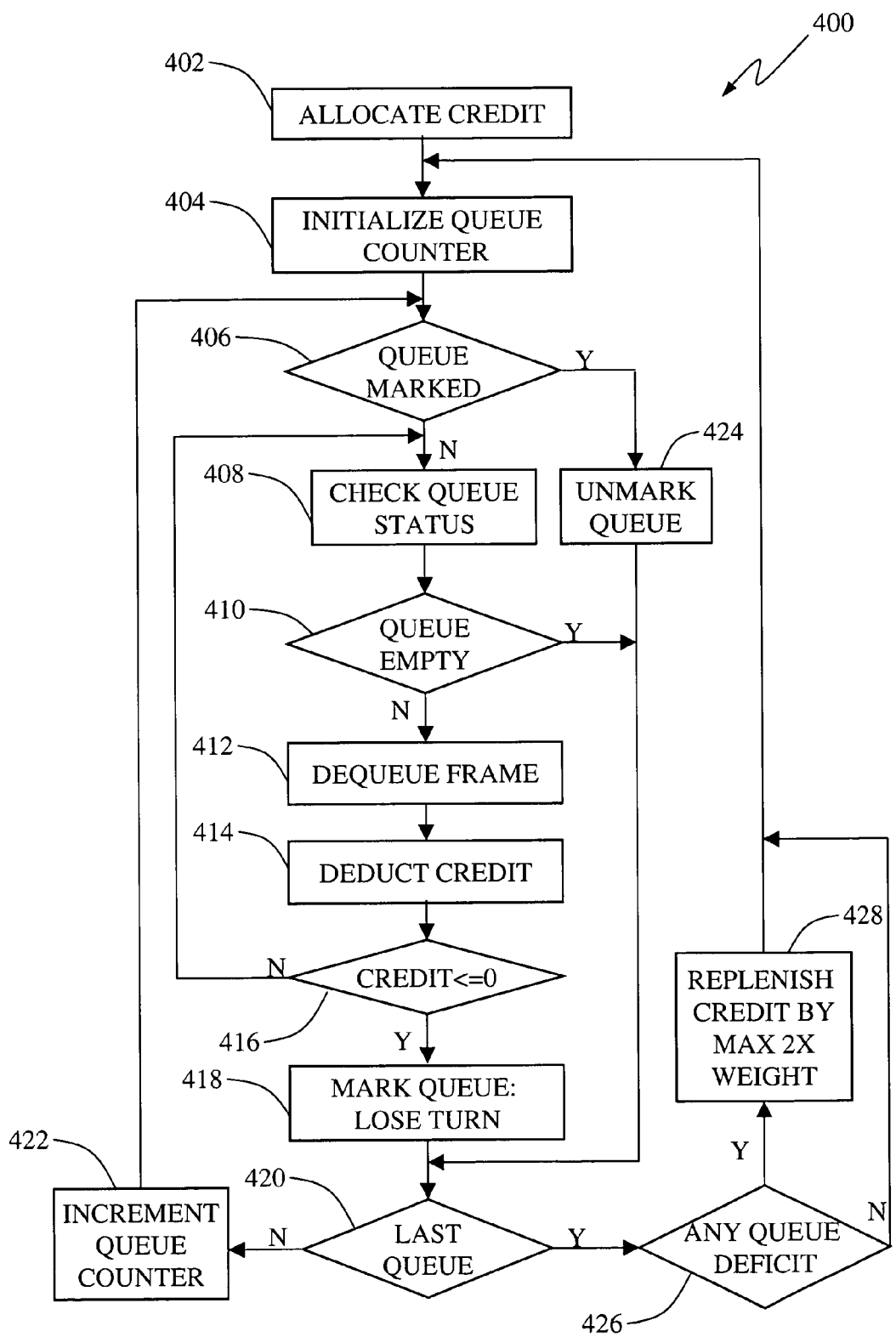
FIG. 4 is a flowchart of the TDRR scheduling method of the second preferred embodiment.

Illustrated in FIG. 4 is the TDRR scheduling method of the second preferred embodiment. When the switching device 100 is initialized or started, the scheduler 144 allocates credit (step 402) to each of the queues PQ1-PQ4 in proportion to the priority level of the queue. The scheduler 144 also initializes (step 404) a queue counter whose value indicates the current queue, namely the highest priority queue PQ4.

If the queue is unmarked, the mark testing (406) is answered in the negative and the scheduler 144 proceeds to determine in the queue status testing (408) whether the current queue is empty or not. If there is a frame ready to be dequeued in the current queue, the queue status testing (410) is answered in the negative and the frame dequeued (412). The credit associated with bandwidth requirement of the frame is then deducted (414) from the available credit being tallied for the current queue. The scheduler 144 repeatedly dequeues (412) frames from the current priority queue until the queue is empty or a deficit condition reached. If the queue is emptied, the queue status testing (410) is answered in the affirmative and the TDRR scheduling method 400 advances directly to the next queue. A deficit condition, on the other hand, occurs when the credit requirement of a frame dequeued (414) from the current queue is equal to or less than the available credit, thereby causing the available credit balance to go zero or negative. Although the scheduler 144 will dequeue a frame despite the fact that it causes a deficit credit condition, no more frames will be dequeue from the current queue until the credit is replenished.

When the queue is emptied and the queue status testing (410) answered in the affirmative, the scheduler 144 increments (422) the queue counter on the condition that the current queue is not the last queue, which is the case when the last queue testing (420) is answered in the negative.

When the scheduler dequeues a frame that causes the available credit to drop to or below zero, the credit testing (416) is answered in the affirmative and the scheduler 144 marks (418) the current queue with a queue deficit flag indicating the deficit state of the current queue. The queue deficit flag effectively prevents the queue in mark testing (406) from being serviced during the next cycle through all queues PQ1-PQ4. The act of passing over a queue with a deficit works to penalize a queue that has been oversubscribed and minimizes the adverse effect on other queues. The decision to dequeue a frame despite the fact that it causes a deficit condition is made in this second embodiment to lessen the probability of buffering a frame that will expire in the queue before the queue is serviced in the next cycle. A voice-over-IP packet supported by the H323 protocol, for example, may time-out and be dropped if held in the buffer for more than 50 to 100 milliseconds.

If the current queue being serviced is empty or the available credit falls to or below zero, the scheduler 144 advances to the next queue. With the exception of the lowest priority queue identified in last queue testing (step 420), the next queue is indicated by the queue counter after it is incremented (step 422). The process by which the queue flag is tested (406), the queue status checked (step 408), the frames dequeued (step 412), and the credit deducted (step 414) is repeated for each queue until the lowest priority queue is reached and the last queue testing (420) answered in the affirmative. If the queue flag for one or more queues has been marked to indicate a deficit condition at any of the priority queues PQ1-PQ4, the queue memory deficit testing (426) is answered in the affirmative and the credit for all of the queues replenished (428) in the manner described above. If, on the other hand, all queues have positive available credit, deficit testing (426) is answered in the negative and the scheduler proceeds to initialize (step 404) the queue counter and enter a new scheduling cycle.

In the course of servicing the priority queues PQ1-PQ4 in the next scheduling cycle, the scheduler 144 will detect in the mark testing (406) whether a queue had previously attained a deficit condition. Where the deficit flag of the current queue has been asserted, the mark testing (406) is answered in the affirmative and the current queue passed over with no frames being dequeued. The mark indicated by the deficit flag is then removed (step 424) or otherwise de-asserted so that the current queue may be serviced once again in the next scheduling cycle.

One skilled in the art will recognize that one or more steps practices by the time-independent scheduling method of the several embodiments may be implemented in software running in connection with a programmable microprocessor; implemented in hardware utilizing either a combination of microprocessors or other specially designed application-specific integrated circuits and programmable logic devices; or various combinations thereof. Thus, embodiments of the invention are not limited to any specific combination of hardware circuitry and software.

In some embodiments, the time-independent scheduling methods are performed by one or more multi-layer switching devices, as defined by the Open Systems Interconnect (OSI) reference model, executing sequences of instructions retained in memory at the device or in another computer-readable medium. The term computer-readable medium as used herein refers to any medium that participates in providing instructions to one or more processors for execution. Such a medium may take many forms, including but not limited to, non-volatile media and volatile media. Non-volatile media includes, but are not limited to, hard disks, optical or magnetic disks, floppy disks, magnetic tape, or any other magnetic medium, CD-ROMs and other optical media, for example. The one or more processors and computer-readable medium may be embodies in one or more devices located in proximity to or remotely from the network administrator viewing the topology display.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

We claim:

1. A time-independent scheduling method for scheduling the output of protocol data units (PDUs) from a plurality of queues, each PDU characterized by an associated credit requirement, the method comprising the steps of:
   allocating credit available to each of the plurality of queues;
   dequeuing at least one PDU from one or more queues having available credit;
   deducting the credit requirement of each PDU dequeued from the available credit associated with the queue from which it was dequeued; and
   replenishing the credit available to all of the plurality of queues only when the available credit associated with one of the plurality of queues is insufficient to dequeue a PDU;
   wherein all of said steps are performed by a queuing manager of a switching device; and
   wherein all of said queues are accessible by the queuing manager.

2. The time-independent scheduling method of claim 1, wherein the credit is bandwidth credit associated with a scheduler output.

3. The time-independent scheduling method of claim 1, wherein the time-independent scheduling method is a deficit round robin scheduling method.

4. The time-independent scheduling method of claim 1, wherein the plurality of queues are network switching device buffers.

5. The time-independent scheduling method of claim 1, wherein the step of replenishing the available credit comprises the step of allocating credit available to each of the plurality of queues in accordance with a set of one or more credit weights.

6. The time-independent scheduling method of claim 5, wherein the credit weight associated with each queue represents the priority of the PDUs buffered in the queue.

7. The time-independent scheduling method of claim 6, wherein the priority of one or more PDUs is derived from a removable PDU priority tag which allows passing over one or more of the plurality of queues.

8. The time-independent scheduling method of claim 1, wherein available credit is insufficient to dequeue a frame if the credit requirement of the frame is greater than the available credit.

9. The time-independent scheduling method of claim 1, wherein available credit is insufficient to dequeue a frame if the credit requirement of the frame, when deducted from the available credit, causes the available credit to be less than or equal to zero.

10. A time-independent scheduling method for scheduling the output of PDUs from a plurality of queues, each PDU characterized by an associated credit requirement, the method comprising the steps of:
    allocating credit available to each of the plurality of queues;
    queuing a plurality of PDUs at a current queue;
    dequeuing one or more PDUs of the plurality of PDUs from the current queue while there is available credit;
    deducting the credit requirement of each of the one or more PDUs dequeued from the available credit associated with the current queue; and
    replenishing the credit available to all of the plurality of queues only when the available credit associated with the current queue is insufficient to dequeue a PDU;
    wherein all of said steps are performed by a queuing manager of a switching device; and
    wherein all of said queues are accessible by the queuing manager.

11. The time-independent scheduling method of claim 10, wherein the credit is bandwidth credit associated with a scheduler output.

12. The time-independent scheduling method of claim 10, wherein the time-independent scheduling method is a deficit round robin scheduling method.

13. The time-independent scheduling method of claim 10, wherein the plurality of queues are network switching device buffers.

14. The time-independent scheduling method of claim 10, wherein the step of replenishing the credit available to the current queue comprises the step of allocating credit to each of the plurality of queues in accordance with a set of credit weights.

15. The time-independent scheduling method of claim 14, wherein the credit weight associated with each queue represents the priority of the PDUs buffered in the queue.

16. The time-independent scheduling method of claim 10, wherein the step of replenishing the credit available further comprises the step of replenishing the available credit for each of the queues when the available credit for any one queue is insufficient to dequeue a frame in the that one queue.

17. A time-independent scheduler for outputting PDUs from a plurality of queues, each PDU characterized by an associated credit requirement, wherein the scheduler executes the method comprising the steps of:
    allocating credit available to each of the plurality of queues;
    dequeuing at least one PDU from one or more queues having available credit;
    reducing the available credit at the one or more queues by the credit requirement of each frame dequeued therefrom; and
    replenishing the available credit to all of the plurality of queues only when the available credit for one of the plurality of queues is insufficient to dequeue a PDU.

18. A time-independent scheduling method, comprising the steps of:
    allocating credit for each of a plurality of queues;
    dequeuing a protocol data unit (PDU) from a first queue within the plurality of queues;
    reducing the credit for the first queue by a credit requirement of the PDU; and
    allocating additional credit for all of the plurality of queues only in response to detecting that a second queue within the plurality of queues has insufficient credit to dequeue a PDU;

wherein all of said steps are performed by a queuing manager of a switching device; and wherein all of said queues are accessible by the queuing manager.

19. The time-independent scheduling method of claim 18, further comprising the step of allocating additional credit for the first queue in response to detecting that the first queue has insufficient credit to dequeue a PDU.

20. The time-independent scheduling method of claim 19, wherein the method further comprises a second allocating step for allocating to the first queue additional credit solely in response to detecting that a queue within the plurality has insufficient credit to dequeue a PDU.

21. The time-independent scheduling method of claim 18, wherein the allocating step comprises fully replenishing the credit for the first queue.

22. A time-independent scheduling method, comprising the steps of:

allocating credit for a plurality of queues, respectively;

dequeuing protocol data units (PDUs) from the plurality of queues, respectively;

reducing the credit for the plurality of queues, respectively, by credit requirements of the PDUs dequeued from the plurality of queues, respectively; and allocating additional credit for all of the plurality of queues, respectively, only in response to detecting that any queue within the plurality of queues has insufficient credit to dequeue a PDU;

wherein all of said steps are represented by instruction stored on memory accessibly by at least one processor wherein an interface is coupled between said at least one processor and said queues;

said instructions are accessible from said memory by said at least one processor whereby said at least one processor interprets and carries out said instructions.

23. The time-independent scheduling method of claim 22, wherein the method further comprises a second allocating step for allocating to the plurality of queues additional credit solely in response to detecting that a queue within the plurality of queues has insufficient credit to dequeue a PDU.

24. The time-independent scheduling method of claim 22, wherein the allocating step comprises fully replenishing the credit for the plurality of queues.

* * * * *